United States Patent [19]

Katayama et al.

[11] Patent Number: 5,043,748

[45] Date of Patent: Aug. 27, 1991

[54] RECORDING APPARATUS

[75] Inventors: Akira Katayama; Ryoichi Koizumi, both of Yokohama; Hideaki Kishida, Yamato, all of Japan

[73] Assignee: Canon Kabushiki Kaisha, Tokyo, Japan

[21] Appl. No.: 593,251

[22] Filed: Oct. 1, 1990

Related U.S. Application Data

[63] Continuation of Ser. No. 269,374, Nov. 10, 1988, abandoned.

[30] Foreign Application Priority Data

Nov. 16, 1987 [JP] Japan .................................. 62-287264

[51] Int. Cl.$^5$ ............................. B41J 2/01; G01D 9/00
[52] U.S. Cl. ............................ 346/140 R; 346/33 ME
[58] Field of Search ...................... 346/33 ME, 140 R

[56] References Cited

U.S. PATENT DOCUMENTS

| | | |
|---|---|---|
| 4,169,991 | 10/1979 | Ross . |
| 4,628,327 | 12/1986 | Anderson et al. ............ 346/33 ME |
| 4,723,129 | 2/1988 | Endo et al. . |
| 4,740,796 | 4/1988 | Endo et al. . |
| 4,782,351 | 11/1988 | Miura ............................. 346/14 OR |

Primary Examiner—George H. Miller, Jr.
Attorney, Agent, or Firm—Fitzpatrick, Cella, Harper & Scinto

[57] ABSTRACT

This invention provides a recording apparatus having a recording head capable of recording a predetermined amount of data at a speed higher than transfer speed of the predetermined image data supplied from image data supply source, carry means to convey recording medium to the recording head, and control means to control conveying speed corresponding to the transfer speed. This invention contributes to obtain a high density clear image capable of continued recording without interrupting conveyance of recording medium.

9 Claims, 4 Drawing Sheets

PAPER FEED STARTS
UPON WORKING MORE THAN $n_1\%$

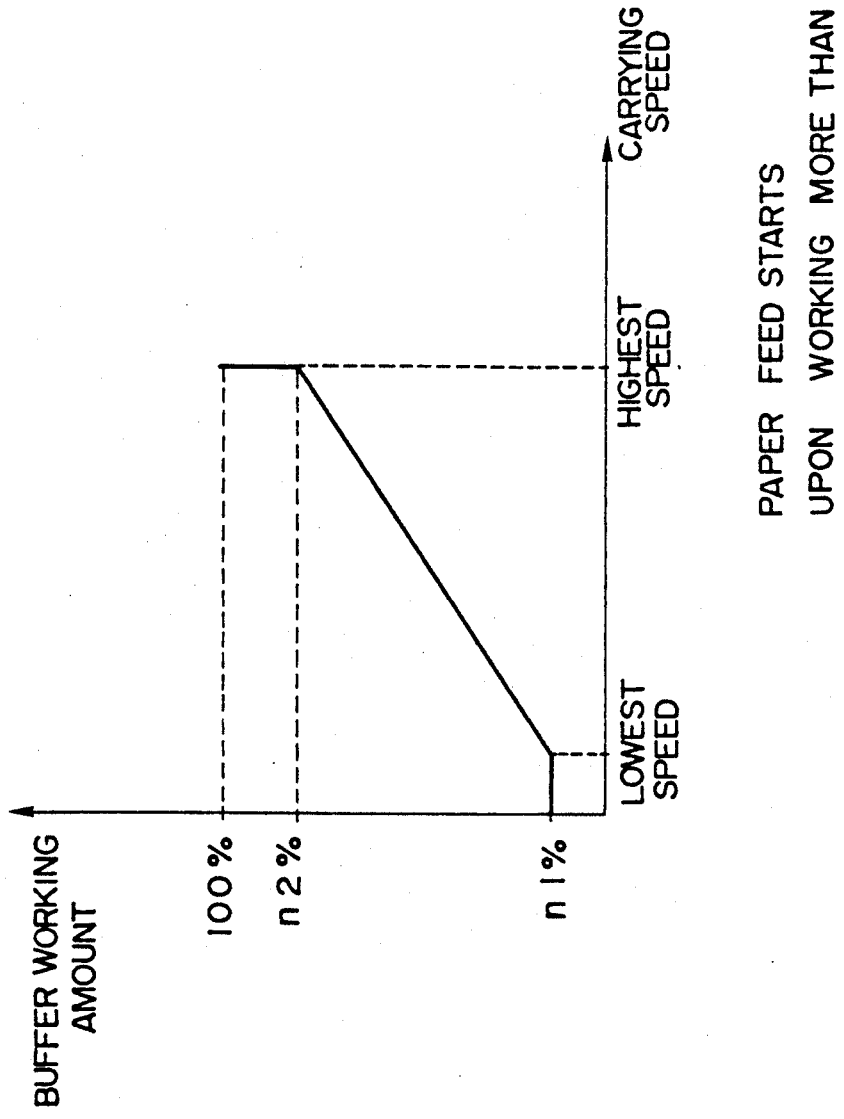

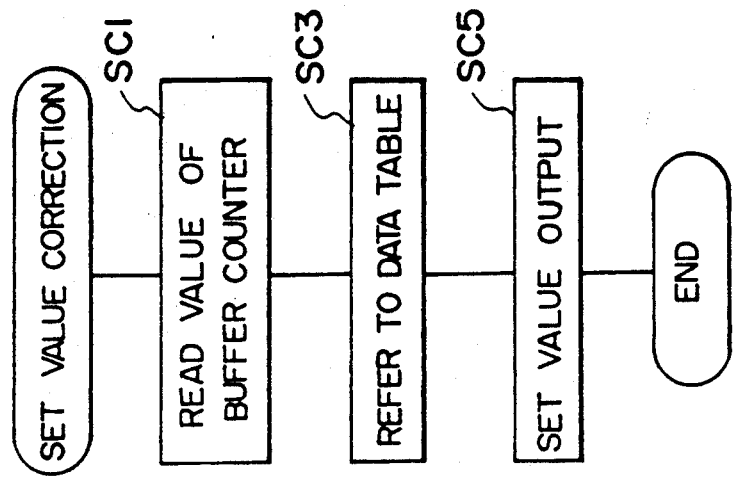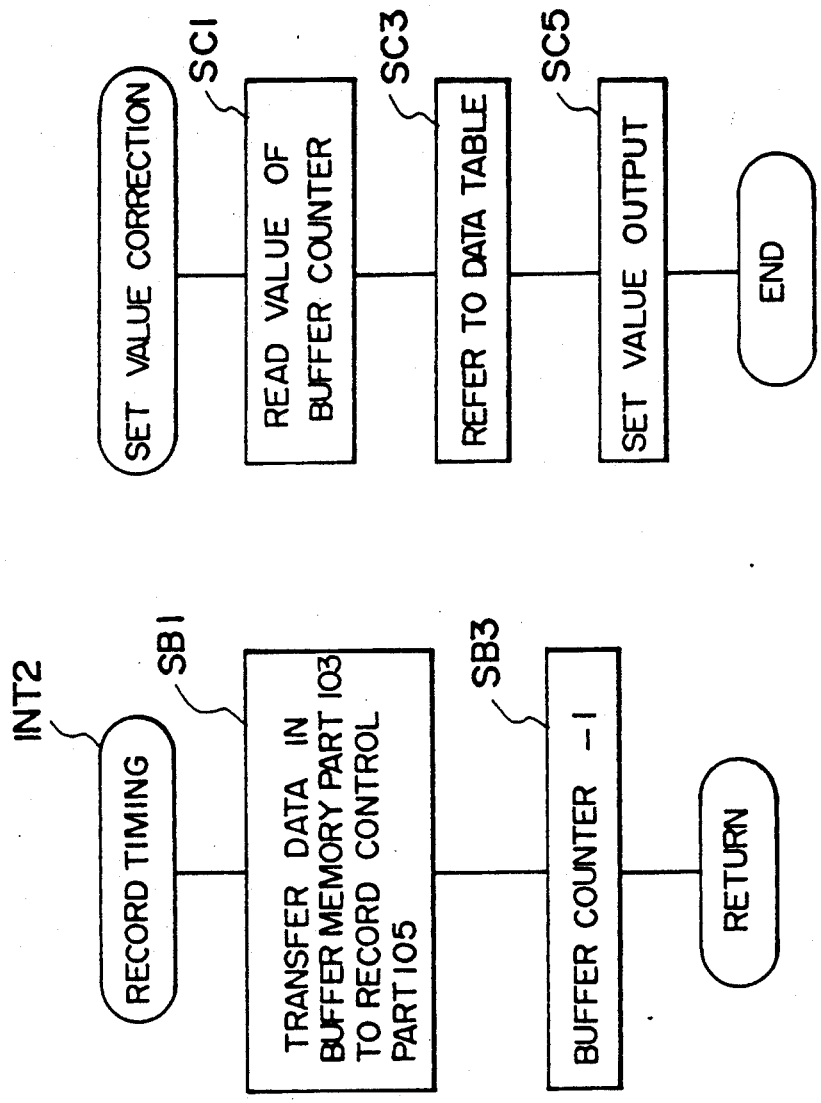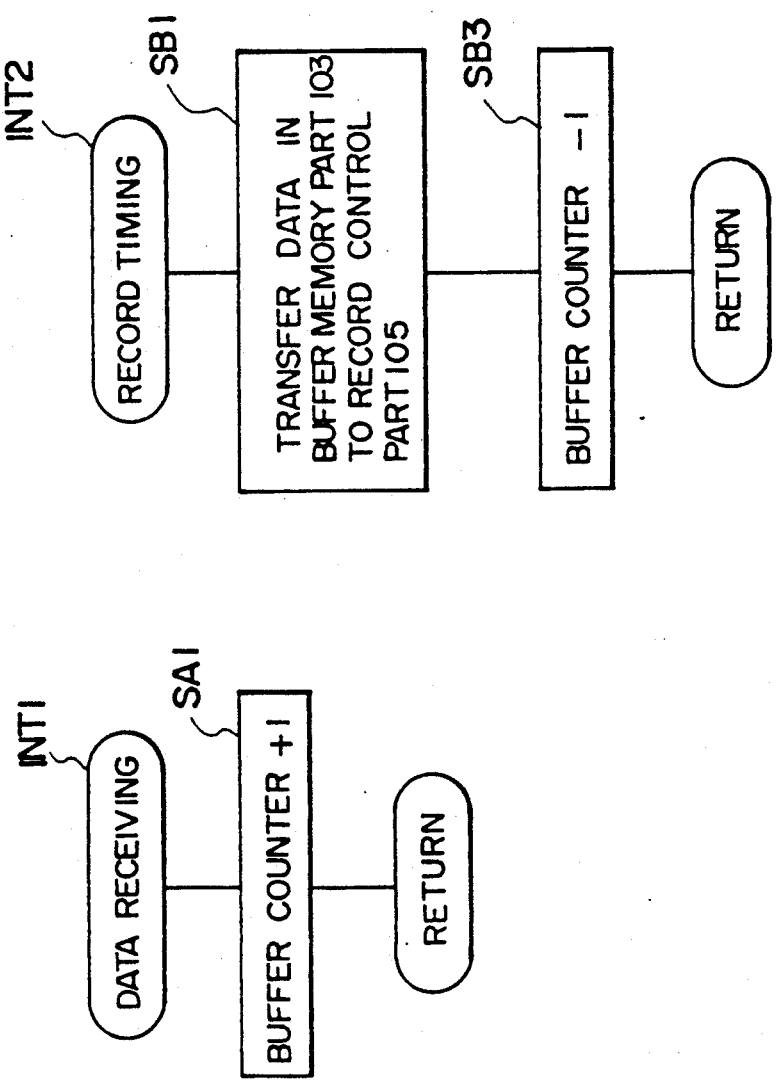

RECORDING APPARATUS

This application is a continuation of U.S. application Ser. No. 07/269,374 filed Nov. 10, 1988, now abandoned.

BACKGROUND OF THE INVENTION

1. Field of the Invention

This invention relates to a recording apparatus, and particularly to a recording apparatus having high density and clear image, which is capable of continued recording at a high speed.

2. Related Background Art

Recently, information processing systems, such as computer systems and image processing systems, have become so widely used that there is a high demand to speed up the operation of various kinds of equipment being used with these systems. Recording apparatus used as information output devices in said system have also been improved, and it may be necessary to drive, such a recording apparatus at a higher operation speed than the image processing speed and/or information transfer speed of the host device used as a supply source of information relating to recording.

In such a case, as mentioned, it is necessary to construct a recording apparatus to record intermittently by interrupting the recording until information to be recorded is supplied. However, in the case of intermittent operation, the drive and stop operation of a recording medium conveying system can cause a problem with overlapping or clearance of the recorded image, which should be uniform, due to back-lash of gears used in the conveying system and expansion or contraction of the recording medium.

These defects are especially serious when making a high density and excellent image recording. For example, if there arises a deviation of several hundred $\mu$m in dots (image element) due to the above mentioned causes, it would tend to significantly deteriorate the quality of the recorded image if one dot is constituted by about 100 $\mu$m.

SUMMARY OF THE INVENTION

An object of the present invention is to solve the problems mentioned above by controlling the recording speed so as to respond to the transfer speed of image information being supplied.

Another object of the present invention is to provide a recording apparatus which comprises a recording head capable of recording a predetermined amount of data at a speed higher than the transfer speed of this predetermined image data being supplied from an image data supply source, conveying means to carry the recording medium to said recording head, and control the means to control conveying speed of the conveying means in response to said transfer speed.

BRIEF DESCRIPTION OF THE DRAWINGS

FIG. 3 shows an example explaining the relation between the image data transfer speed and the carrying speed of the recording medium; and FIGS. 4A, 4B and 4C are flow charts showing an example of controlling the carrying speed of the recording medium according to said embodiment.

DESCRIPTION OF THE PREFERRED EMBODIMENT

According to the present invention, since the carrying speed of the recording medium is adjusted in response to the transfer speed of image data it is unnecessary to interrupt the carrying state by the carrying means in response to the operating speed of the recording head. Consequently, there is none of the defects previously mentioned being caused by an intermittent carrying operation.

Figure 1:
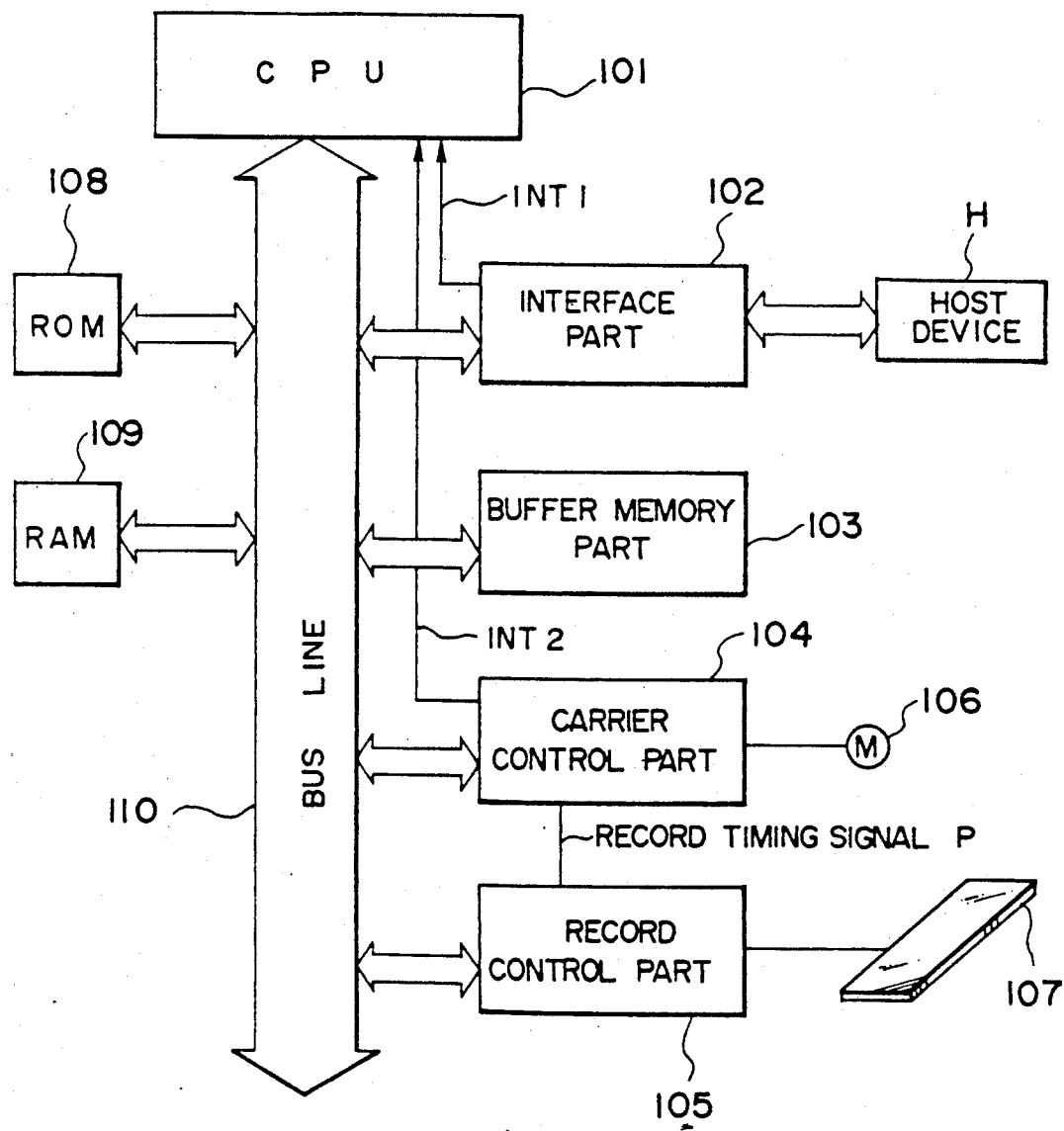
FIG. 1 shows a block diagram of an embodiment of the recording apparatus according to the present invention.

FIG. 1 shows an embodiment of the present invention. In FIG. 1, 101 is a CPU of, for example, the microprocessor type to control each part on the basis of the processing sequence shown in FIGS. 4A to 4C, 102 is an interface part to control, between external host device H, receiving and transmitting image data relating to recording and control signals and to produce data reception interrupting signal INT1 to CPU 101 in response to the reception of a predetermined image data from host device H. An element 103 is a buffer memory to temporarily contain image data transferred from host device H. An element 104 is a carrier control part to control the conveying speed of the recording medium output synchronizing interrupting signal INT2 and record timing signal P to inform CPU 101 and record control part 105, respectively, of record timing in conformity with conveying speed, 106 is motor for the carrying system being controlled by carry control part 104, and it may be, for example, a DC motor.

Record control part 105 supplies to record head unit 107 a predetermined record data sent out from buffer memory part 103 in synchronization with record timing signal P. Record head unit 107 is a line head for recording on each line of the record medium, which may be for example a so-called full line type ink jet record head provided with an ink discharge port corresponding to the whole width of the record medium or the whole width of a record region.

ROM 108 contains a table of data for determining the carrier speed of the record medium corresponding to the transfer speed of image data from host device H in addition to the processing sequence prosecuted by CPU 101, 109 is RAM used for operation of, for example, the counter. Bus line 110 includes a control bus, data bus and address bus connecting parts 101–105, 108 and 109.

Figure 2:
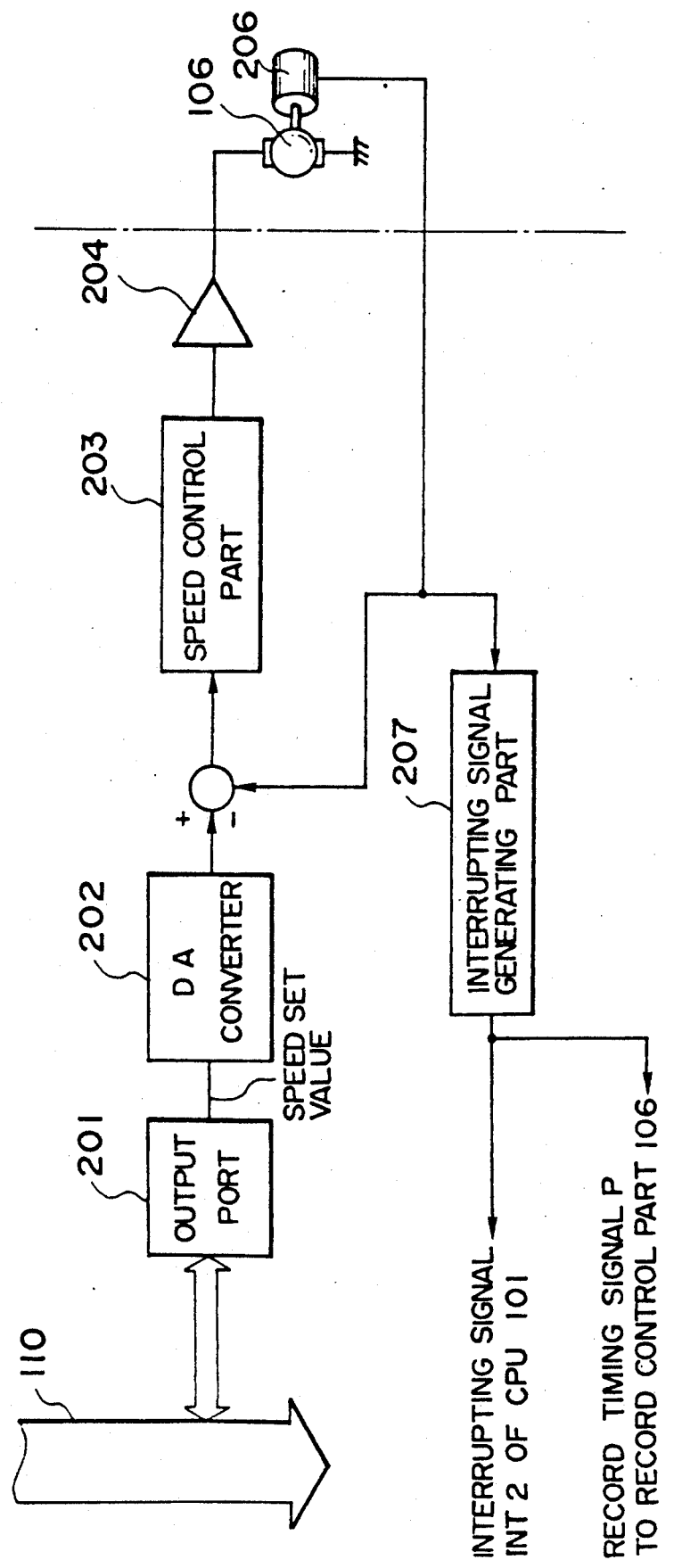
FIG. 2 shows a block diagram of an embodiment of a carry control part of the recording apparatus shown in FIG. 1.

FIG. 2 shows an embodiment of the carry control part in FIG. 1, where 201 is an output port for outputting a set value of carry speed from CPU 101, 202 is a D/A converter to convert the output set value, which is digital data, into an analog value, 203 is a speed control part to control the rotating speed of motor 106 on the basis of said set value analog quantity, and 204 is an amplifier to applying the output of speed control part 203 to motor 106.

Encoder 206 is for outputting a pulse signal proportional to the rotating speed of motor 106, and to feed back this output to speed control part 203 and lead it to interrupt signal generating part 207. Interrupt signal generating part 207 produces an interrupt signal INT2 to inform CPU 101 of record timing and timing signal P to record control part 106, on the basis of the carry state of the record medium, which is output from encoder 206.

In the present embodiment, image data from host device H is stored in buffer memory 103 and sent to record control part 105 when read out from buffer memory 103, and consequently, by identifying the amount of data contained in buffer memory 103, namely the working or service rate of buffer memory, it is possible to control the carry speed to correspond to the transfer speed from host device H, which in turn controls the recording speed required for recording a predetermined amount of data at the recording device. In other words, if the recording speed is higher when compared to the transfer speed, the working rate becomes lower.

In the present invention, as shown in FIG. 3, the carry speed of recording medium is determined by making the carry speed correspond to the working ratio of buffer memory part 103. Data of a set value for carry control part 104 is stored in a table in ROM 108 in correspondence with data showing the working rate of buffer memory 103. While data showing the working rate stored in a counter provided in RAM 109, called hereafter a buffer counter. The content of the buffer counter is then increased or decreased each time a predetermined amount of data, for example, the data of one line, is accessed to buffer memory part 103, so as to properly use the value of buffer counter. In the example shown in FIG. 3, the highest speed of the carry system is obtained at more than n2%, suitable speed is obtained at less than n2% but more than n1% and the carry system is stopped at less than n1%.

FIGS. 4A, 4B and 4C show an example of a record speed control sequence of the present embodiment. FIG. 4A shows a sequence which is initiated by interrupt signal INT1 produced by interface 102 in response to the receipt of a predetermined amount of image data from host device H, and at the step SA1, the content of buffer counter is stepped by +1 and the processing is finished. Interface 102 can be made to produce signal INT1 upon receipt of data of the amount supplied at one time from record control part 105, for example, one line.

FIG. 4B shows a sequence initiated in response to interrupt signal INT2 produced by carry control part 104. In this case, at step SB1, a predetermined amount of data is transferred from buffer memory part 103 to record control part 105, and at step SB3, the content of the buffer counter is stepped by −1 and the processing is finished.

FIG. 4C shows a sequence for correcting the set value initiated at a proper timing. In this case, at step SC1, the content of the buffer counter is read, at step SC3, the set value in response to said read-out value directed to carry control part 104 is read out. And then, at step SC5, this set value is sent out to carry control part 104 and the processing is finished. Thus the carry speed corresponding to the buffer working rate, i.e., the transfer speed, is obtained.

According to the above described embodiment, since the recording speed of the recording device is controlled in response to the transfer speed of record information from host device H, it is possible not to stop carry system during the recordal of one consecutive information, so that distortion of the image due to, for example expansion contraction of he record medium is avoided. And in the case of using an ink jet recording head as record head unit 107, it is possible to avoid unevenness of discharge of ink accompanied with interruption of record.

The present invention should not be limited to a record device using an ink jet recording head. This invention can be effectively and easily applied to any recording system so far as the recording device can be driven at an operation speed exceeding the image data transfer speed from an image data supply source such as a host device.

And further, the control of recording speed can be made not only in response to the working rate of the buffer but also on the basis of the transfer speed itself, and the determination of control data is not limited to the curve shown in FIG. 3.

Moreover, each constitutional part is not limited to the aforementioned equipment. For example, in the above mentioned embodiment a DC motor is used as a driving source of carry system, this may be replaced by a pulse motor, and in this case, with respect to the structure in FIG. 2, D/A converter 202 and the closed loop system in speed control part 203 can be eliminated or significantly simplified.

As explained in the foregoing, according to the present invention, recording speed is controlled corresponding to the transfer speed of the supplied image the interruption of driving of the carry system is not required in the case when the recording speed exceeds the transfer speed, so that the distortion or disturbance of the recorded image caused by expansion-contraction of record medium due to intermittent driving is avoided, which enables to obtain high quality image record.

In case of forming liquid drops utilizing heat energy as disclosed in, for example, U.S. Pat. No. 4,723,129 and 4,740,796, it is easy to increase the array density of the discharge ports, and it is easy to prepare a compact recording head long enough to cover the total width of a recording area. And further, this system is suitable for high speed recording. Consequently, when the present invention is applied to the ink jet recording head of this system, it is possible to further improve the capacity of this recording head.

We claim:

1. A recording apparatus comprising:
    a buffer memory part for temporarily storing information from an image data supply source;
    a recording head capable of recording a predetermined amount of image data on a recording medium at a speed higher than a speed of transfer of the predetermined amount of image data from the image data supplying source, the transfer speed corresponding to a rate of use of said buffer memory part;
    carrying means for carrying the recording medium toward said recording head; and
    control means for controlling the carrying speed of said recording medium, to reduce the carrying speed, while recording, in response to a decrease in said transfer speed.

2. A recording apparatus according to claim 1, wherein said recording head is an ink jet recording head.

3. A recording apparatus according to claim 2, wherein said ink jet recording head includes ink discharging ports over the entire width of a recording area.

4. A recording apparatus according to claim 2, wherein said recording head discharges ink for recording utilizing heat energy.

5. A recording apparatus according to claim 1, wherein said control means controls the carrying speed on the basis of working rate of said buffer memory part.

6. A recording apparatus according to claim 1, wherein said control means produces a signal for record timing.

7. A recording apparatus according to claim 1, wherein said control means comprises a speed control part to control the rotating speed of a motor for driving said carrying means.

8. A recording apparatus comprising:
an ink jet recording head for forming an image on a recording medium in accordance with a recording signal, said recording signal comprising recording data supplied to said recording apparatus from a host device;
control means for controlling said recording head to record in response to said recording signal so as to maintain a difference of speed between said recording head and the recording medium; and
means for setting said difference of relative speed at either a maximum speed difference or a speed difference smaller than said maximum speed difference, while recording, in accordance with a transfer speed of recording data from said host device to said recording apparatus.

9. A recording apparatus according to claim 8, wherein said recording head discharges ink for recording by utilizing heat energy.

* * * * *

UNITED STATES PATENT AND TRADEMARK OFFICE
CERTIFICATE OF CORRECTION

PATENT NO. : 5,043,748
DATED : August 27, 1991
INVENTOR(S) : Akira Katayama, et al.

It is certified that error appears in the above-identified patent and that said Letters Patent is hereby corrected as shown below:

COLUMN 2:

Line 27, change "medium" to -- medium, --.

COLUMN 3:

Line 64, change "of he" to -- of the --.

COLUMN 4:

Line 23, change "image the" to -- image, the --.

Signed and Sealed this

Sixth Day of April, 1993

*Attest:*

STEPHEN G. KUNIN

*Attesting Officer*          *Acting Commissioner of Patents and Trademarks*